US011489730B2

(12) United States Patent
Savino et al.

(10) Patent No.: US 11,489,730 B2
(45) Date of Patent: Nov. 1, 2022

(54) METHODS, APPARATUSES AND SYSTEMS FOR CONFIGURING A NETWORK ENVIRONMENT FOR A SERVER

(71) Applicant: Storage Engine, Inc., Tinton Falls, NJ (US)

(72) Inventors: Trevor Savino, Seymour, CT (US); James Patrick Hart, Brick, NJ (US); Justin Furniss, Egg Harbor City, NJ (US); Charles Wooley, Sea Girt, NJ (US)

(73) Assignee: Storage Engine, Inc., Tinton Falls, NJ (US)

( * ) Notice: Subject to any disclaimer, the term of this patent is extended or adjusted under 35 U.S.C. 154(b) by 19 days.

(21) Appl. No.: 16/223,387

(22) Filed: Dec. 18, 2018

(65) Prior Publication Data
US 2020/0195513 A1 Jun. 18, 2020

(51) Int. Cl.
*H04L 41/12* (2022.01)
*H04L 41/0654* (2022.01)
(Continued)

(52) U.S. Cl.
CPC .......... *H04L 41/12* (2013.01); *G06F 11/1464* (2013.01); *H04L 41/0654* (2013.01);
(Continued)

(58) Field of Classification Search
CPC . H04L 41/12; H04L 41/0654; H04L 41/0886; H04L 61/2507; H04L 63/20; H04L 67/1091; G06F 11/1464
See application file for complete search history.

(56) References Cited

U.S. PATENT DOCUMENTS 7,321,918 B2   1/2008  Burd et al.
8,065,559 B2   11/2011 Kamath et al.
(Continued)

FOREIGN PATENT DOCUMENTS

CN   101309167 A   11/2008
CN   201479165 U    5/2010
(Continued)

OTHER PUBLICATIONS

Stankovic "What is a SQL Server disaster recovery?", SQLShack, Mar. 14, 2014.
(Continued)

*Primary Examiner* — Dhairya A Patel
(74) *Attorney, Agent, or Firm* — Moser Taboada (57) ABSTRACT

Methods, apparatuses and systems for cloud-based disaster recovery are provided. The method, for example, includes receiving, at a cloud-based computing platform, first internet protocol (IP) information relating to a first network environment associated with a server used by a client machine; translating the first IP information, without having to interpose a camouflage layer into the first IP information, and generating second IP information based on the translated first IP information, the second IP information used for creating a second network environment for the server; creating the second network environment for the server; and deploying the server in the created second environment.

9 Claims, 5 Drawing Sheets

(51) Int. Cl.
*H04L 41/08* (2022.01)
*G06F 11/14* (2006.01)
*H04L 9/40* (2022.01)
*H04L 67/1087* (2022.01)
*H04L 61/2503* (2022.01)

(52) U.S. Cl.
CPC ...... *H04L 41/0886* (2013.01); *H04L 61/2503* (2013.01); *H04L 63/20* (2013.01); *H04L 67/1091* (2013.01)

(56) References Cited

U.S. PATENT DOCUMENTS

| | | | |
|---|---|---|---|
| 8,387,114 | B2 | 2/2013 | Sugarbroad |
| 8,812,904 | B2 | 8/2014 | Kamath et al. |
| 8,909,977 | B2 | 12/2014 | Morosan et al. |
| 9,300,633 | B2 | 3/2016 | Acharya et al. |
| 9,336,103 | B1 | 5/2016 | Hasbe et al. |
| 9,501,361 | B2 | 11/2016 | Bates |
| 9,525,592 | B2 | 12/2016 | Tung |
| 9,575,798 | B2 | 2/2017 | Terayama et al. |
| 9,894,098 | B2 | 2/2018 | Sabin |
| 9,934,054 | B2 | 4/2018 | Baset et al. |
| 10,193,698 | B1 * | 1/2019 | Das .......... G06F 21/33 |
| 11,436,075 | * | 9/2022 | Jain .......... H04L 43/08 |
| 2010/0293147 | A1 | 11/2010 | Snow et al. |
| 2013/0103834 | A1 | 4/2013 | Dzerve et al. |
| 2014/0245423 | A1* | 8/2014 | Lee .......... H04L 63/0218 726/12 |
| 2014/0289797 | A1 | 9/2014 | Trani |
| 2015/0229638 | A1 | 8/2015 | Loo |
| 2015/0341221 | A1* | 11/2015 | Vatnikov .......... G06F 11/1438 718/1 |
| 2016/0117231 | A1 | 4/2016 | Lee et al. |
| 2017/0060608 | A1* | 3/2017 | Raghunathan .......... G06F 11/14 |
| 2017/0099188 | A1 | 4/2017 | Chang et al. |
| 2017/0149585 | A1* | 5/2017 | Norris .......... H04L 12/4641 |
| 2018/0139175 | A1* | 5/2018 | Parvanov .......... H04L 67/10 |
| 2018/0198754 | A1 | 7/2018 | Kielhofner et al. |
| 2018/0295036 | A1* | 10/2018 | Krishnamurthy ... G06F 11/3433 |
| 2020/0084178 | A1* | 3/2020 | Dreyer .......... H04L 41/0856 |
| 2020/0099603 | A1* | 3/2020 | Gupta .......... H04L 45/745 |
| 2020/0099656 | A1* | 3/2020 | Mittal .......... H04L 61/2592 |
| 2020/0242019 | A1* | 7/2020 | Rodrigues .......... H04L 41/0806 |

FOREIGN PATENT DOCUMENTS

| | | | |
|---|---|---|---|
| CN | 102932407 | A | 2/2013 |
| CN | 104767643 | A | 7/2015 |
| CN | 106982259 | A | 7/2017 |
| CN | 108234191 | A | 6/2018 |
| CN | 108632057 | A | 10/2018 |
| EP | 2251783 | A1 | 11/2010 |
| JP | 2012068771 | A | 4/2012 |
| KR | 20150121891 | A | 10/2015 |
| WO | WO-2007111086 | A1 | 10/2007 |
| WO | WO-2015109804 | A1 | 7/2015 |
| WO | WO-2017161979 | A1 | 9/2017 |
| WO | WO-2021133479 | A1 * | 7/2021 ......... H04L 41/0609 |

OTHER PUBLICATIONS

Alcântara et al "GINJA: One-dollar Cloud-based Disaster Recovery for Databases", Middleware '17, Dec. 11-15, 2017, Las Vegas, NV, USA.

"Acronis® Disaster Recovery as a Service", Acronis, Downloaded from web site http://dl.acronis.com/u/pdf/Acronis-DRaaS_datasheet_en-US.pdf.

* cited by examiner

METHODS, APPARATUSES AND SYSTEMS FOR CONFIGURING A NETWORK ENVIRONMENT FOR A SERVER

FIELD

The disclosure generally relates to methods, apparatuses and systems for configuring a network environment for a server, and more particularly, to methods, apparatuses and systems for automatically configuring a network environment for a server using translated network setting information.

BACKGROUND

Client workstations within an organization's work facilities use one or more servers to perform various operations associated with the organization. The servers and the client workstations connect to and/or communicate with one or more networks. The networks are configured with their own network setting information, e.g., internet protocol (IP) rule information, firewall setting information, network address translation (NAT) information, resource allocation information, network connection information, etc.

Typically, a user (e.g., an information technology (IT) technician or other qualified person) maintains/manages the servers and/or networks within an organization's work facilities, e.g., restores the servers/networks in the event of disaster (disaster recovery (DR), performs routine maintenance checks of the server/networks including performing disaster recovery (DR) tests, etc. With respect to DR of a server, for example, the user copies the network setting information for a network environment used by the server and uses the copied network setting information to create one or more new network environments for the server. Some of the copied network setting information, however, needs to be changed when creating the new network environment, e.g., the network address information. The complexity of the network setting information, however, can make creating the new network environment quite challenging and/or time consuming for a user, especially when more than one network needs to be created.

Accordingly, there is a need for methods, apparatuses and systems for automatically configuring a network environment for a server using translated network setting information.

SUMMARY

Accordingly, methods, apparatuses and systems for automatically configuring a network environment for a server using translated network setting information, are disclosed herein.

In accordance with an aspect of the disclosure, there is provided a method for cloud-based disaster recovery. The method includes receiving, at a cloud-based computing platform, first internet protocol (IP) information relating to a first network environment associated with a server used by a client machine; translating the first IP information, without having to interpose a camouflage layer into the first IP information, and generating second IP information based on the translated first IP information, the second IP information used for creating a second network environment for the server; creating the second network environment for the server; and deploying the server in the created second environment.

In accordance with an aspect of the disclosure, there is provided a nontransitory computer readable storage medium having stored thereon instructions that when executed by a processor perform a method for cloud-based disaster recovery. The method includes receiving, at a cloud-based computing platform, first internet protocol (IP) information relating to a first network environment associated with a server used by a client machine; translating the first IP information, without having to interpose a camouflage layer into the first IP information, and generating second IP information based on the translated first IP information, the second IP information used for creating a second network environment for the server; creating the second network environment for the server; and deploying the server in the created second environment.

In accordance with an aspect of the disclosure, there is provided a cloud-based server of a cloud-based computing platform. The cloud-based server includes a processor and a memory coupled to the processor and having stored thereon instructions that when executed by the processor configure the cloud-based server to receive, at a cloud-based computing platform, first internet protocol (IP) information relating to a first network environment associated with a server used by a client machine; translate the first IP information, without having to interpose a camouflage layer into the first IP information, and generating second IP information based on the translated first IP information, the second IP information used for creating a second network environment for the server; create the second network environment for the server; and deploying the server in the created second environment.

BRIEF DESCRIPTION OF THE DRAWINGS

The above and other aspects, features and advantages of certain embodiments of the disclosure will be more apparent from the following detailed description taken in conjunction with the accompanying drawings, in which.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the disclosure. In the description of the drawings, similar reference numerals are used for similar elements.

Cloud computing can refer to computing that can involve many computers connected through a communication network such as the Internet. Cloud computing can be a form of distributed computing over a network, and can include the ability to run a program or application (e.g., a web application) on many connected computers at the same time.

Cloud storage can refer to a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Disaster Recovery as a service (DRaaS) can refer to the use of physical machines, virtual machines, and/or other resources to perform disaster recovery offered with a cloud-service model.

Virtual machine (VM) can refer to a software-based emulation of a computer. Virtual machines can operate based on the computer architecture and functions of a computer.

Figure 1:
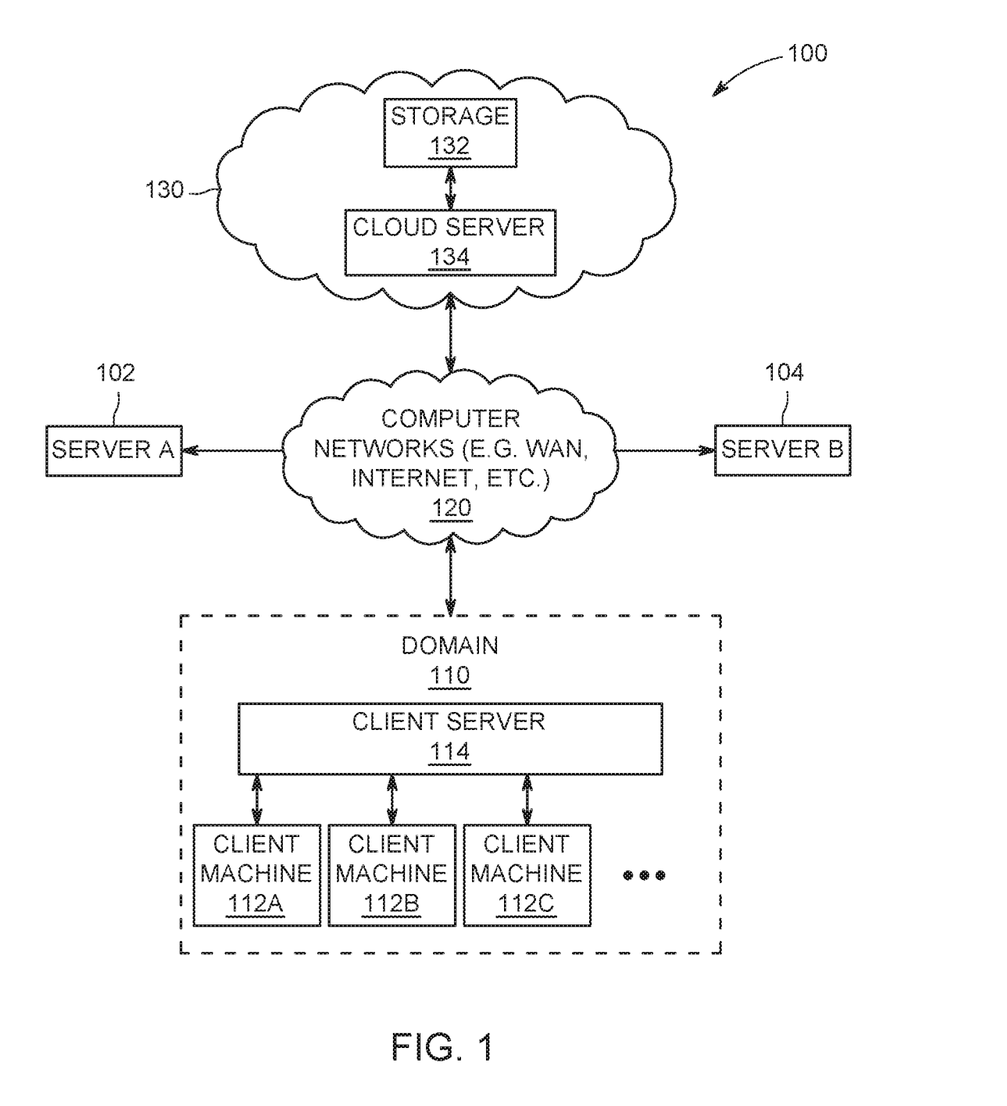
FIG. 1 is a diagram of a cloud-based system that uses a web-based application for creating a network environment, in accordance with an embodiment of the disclosure.

FIG. 1 is a diagram of a cloud-based system 100 (system 100) that uses a web-based application, in accordance with an embodiment of the disclosure. The system 100 can provide DRaaS and can be used for data backup and recovery of servers used by client workstations, e.g., for cloud-based recovery of the servers in the event of a disaster, which can include creating a new network environment for a server.

The system 100 includes a client domain 110, at least one computer network 120 and a cloud-based computing platform 130. The client domain 110 includes at least one client machine 112A-112O (hereinafter collectively referred to as client machines 112) and an onsite client server 114, which partitions tasks or workloads between the client machines 112 and one or more service providers, i.e., servers 102 and 104. A workload, for example, can be a collection of servers, sub-servers, files, networks, databases, firewalls, NATs, etc. that can be associated with the one or more service providers.

The cloud-based computing platform 130 includes a cloud-based storage device 132 (storage 132) and at least one cloud-based server 134 (cloud server 134). The cloud-based computing platform 130 may also include a virtual machine representing virtualized client workloads. The cloud-based computing platform 130 communicates with the client domain 110 via a computer network 120, which can be a wide-area network (WAN), an Internet and other networks implemented for communication by the client domain 110; a more detailed description of the computer network 120 is described below. In addition, while the storage 132 is illustrated as a single, physical device, the storage 132 can span multiple servers and can be accessed by clients over the internet. The components located in or used by the client domain 110 and the computer network 120 can be considered a network environment, as described in greater detail below.

A client in the client domain 110 can interact via one or more user interfaces of the client server 114 (which can be provided to a user at the client machines 112) through the computer network 120 with the web-based application and executed via, for example, the cloud server 134 of the cloud-based computing platform 130.

For example, the web-based application as described herein can be used at the cloud server 134 to manage network setting information associated with the servers 102, 104 that are used locally by the client machines 112 at the client domain 110. The network setting information managed by the cloud-based server can be used to create one or more network environments for the servers 102, 104, e.g., for performing tests, in the event of disaster, etc. For example, if the servers 102, 104 become inoperable (e.g., crash, become corrupted, or destroyed), or as part of routine maintenance operations (e.g., testing, adding/removing servers, etc.), the network setting information managed by the cloud server 134 can used to create a new network environment for the servers 102, 104, so that the servers 102, 104 can be deployed in the newly created network environment and used by the client machines 112 at the client domain 110.

Figure 2:
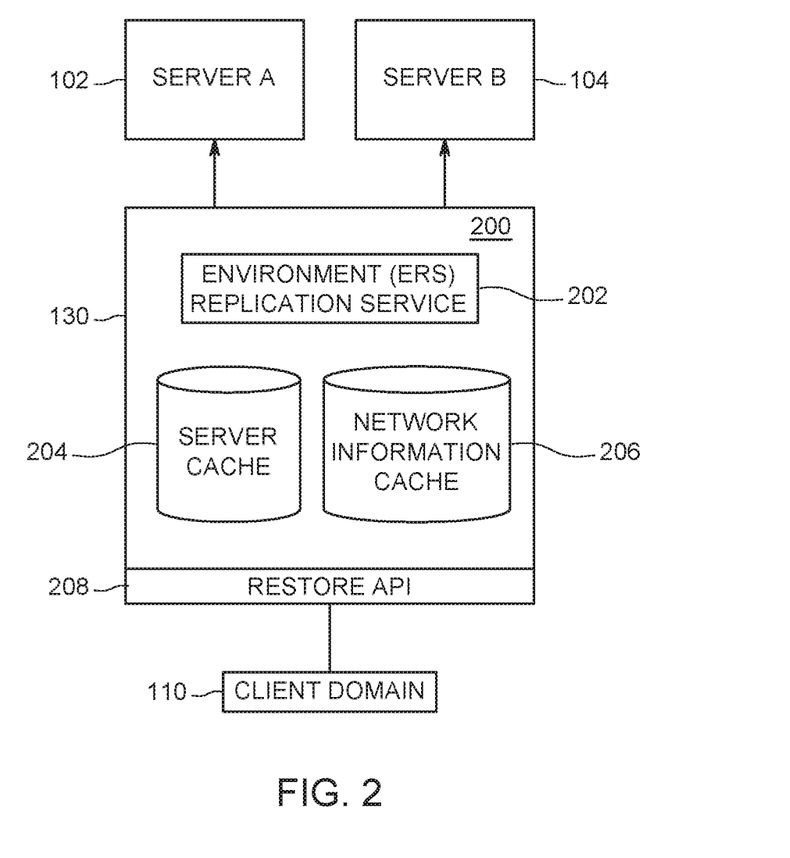
FIG. 2 is a diagram of a cloud-based computing platform including the web-based application for configuring the network environment for one or more servers used in a client domain, in accordance with an embodiment of the disclosure.

FIG. 2 is a diagram of the cloud-based computing platform 130 including a web-based application 200 for restoring one or more servers used in the client domain 110, which can include configuring a network environment for the one or more servers, in accordance with an embodiment of the disclosure. The web-based application 200 includes an Environment Replication Service (ERS) 202 that communicates directly via the computer network 120 with the client machines 112 and is configured to receive the network setting information from the client machines. For example, during an initial install of the web-based application 200 at the client machines 112 in the client domain 110, a user is prompted to input network setting information relating to the servers 102, 104. Once received at the ERS 202, the ERS 202 stores/manages the network information, which can then be used for configuring/creating the network 120 associated with the servers 102, 104. The network information can include, for example, IP information including, but not limited to, interface information, resource allocation information, port location information, firewall information, network address information, NAT information, etc.

Particularly, the ERS 202 compiles the network information for each of the servers 102, 104, and stores this information locally in the cloud-based computing platform 130. More particularly, the ERS 202 compiles the network information for the servers 102, 104 in one or more data look-up tables using identification (ID) information of the servers 102, 104 that are being managed and stores the compilation to local cache. For illustrative purposes, a listing of the ID information of the servers 102, 104 is shown stored in server cache 204, and a listing of corresponding network information is shown stored in a network information cache 206. The information contained in the server cache 204 and the network information cache 206 can be also stored in the storage 132 for access thereof by a user via the user interface provided at the client domain 110 (e.g., at the client server 114 and/or the client machines 112), to view, remove, or make changes to the information contained therein.

The ERS 202 communicates with a restore application programming interface (API) 208 of the web-based application 200. The restore API 208 receives a request from the client domain 110 for restoring an inoperable (or corrupted) server(s) (e.g., one or both servers 102, 104) and transmits this request to the ERS 202, which, in turn, provides the information stored in the server cache 204 and the network information cache 206 (including the network information) to the restore API 208. With the information stored in the server cache 204 and the network information cache 206, the restore API 208 can configure/create a new network environment and deploy the inoperable server(s) (and/or other servers associated with the inoperable server), which triggered the request to the restore API 208, in the newly created network environment. That is, since the network information is being stored/managed by the ERS 202, the restore API 208 can automatically create the new network environment for the inoperable server without any (or with minimal) manual intervention.

Additionally, the restore API 208 can also provide a user with the information being stored/managed by the ERS 202, e.g., for performing one or more tests, routine maintenance operations, etc. For example, using the restore API 208, a user can view/change the information stored at the server cache 204, the network information cache 206 of the ERS 202, and or the storage 132. For example, a user may want to change hostname information of an inoperable server (e.g., one or both servers 102, 104) prior to that server being deployed in the newly created network environment, such as when a replacement server is used in out-of-place restoration of a server and a user wants to use a different hostname for the replacement server.

Similarly, a user can query the ERS 202 using the restore API 208 to view other information stored in the server cache 204 and the network information cache 206 (and/or the storage 132), such as information relating to whether the server deployed in the new network environment performed as expected, results of previously performed DR tests, changes made to the network setting information used in the new network environment, etc.

The restore API 208 can use the network information to deploy the servers 102, 104 to an environment corresponding to a particular date and time, e.g., one, two, three, . . . , hours, days, weeks, . . . ago. For example, changes made to the network setting information by a user can be stored/managed by the ERS 202. Accordingly, a user can request that the restore API 208 create the new network environment using network information other than the network information that was originally (or previously) provided.

Figure 3A:
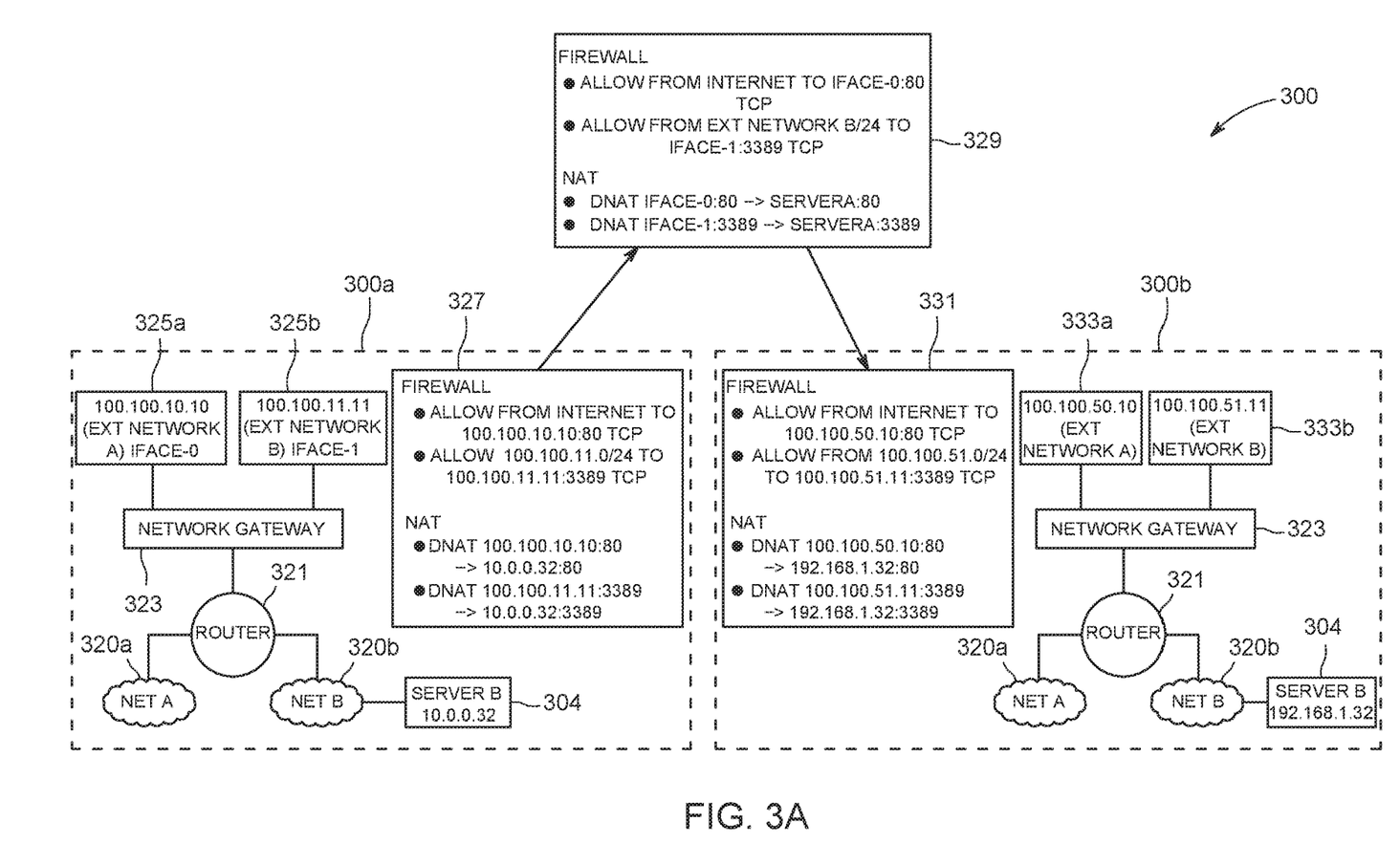
FIG. 3A is a diagram of a network configuration, in accordance with an embodiment of the disclosure.

FIG. 3A is a diagram of a network configuration 300 including first and second network environments 300a, 300b in which servers 302, 304 are both located. The servers 302, 304 are configured as described above with respect to servers 102, 104. For illustrative purposes, in the first and second network environments 300a, 300b the server 302 is shown connected to a network 320a, and the server 304 is shown connected to a network 320b; the networks 320a, 320b can be configured similarly to the network 120 described above.

Additionally, in the first network environment 300a both the networks 320a, 320b can be connected to a router 321 that connects to a network gateway 323 which can include network information 325a, 325b (e.g., IP information of the servers 302, 304). Each of the network information 325a, 325b can be compiled into IP rules 327 (e.g., a data look-up table including firewall rules, resource allocations, port designation rules, NAT rules, etc.) that are configured using the network information 325a, 325b. The network information 325a, 325b including the IP rules 327 can be stored in the network information cache 206.

Similarly, in the second network environment 300b both the networks 320a, 320b can be connected to the router 321 that connects to the network gateway 323 which can include network information 333a, 333b. Each of the network information 333a, 333b can be compiled into IP rules 331 (e.g., a data look-up table including firewall rules, resource allocations, port designation rules, NAT rules, etc.); however, the network information 333a, 333b and the IP rules 331 are different from the network information 325a, 325b and the IP rules 327, as described in greater detail below. The network information 333a, 333b including IP rules 331 can also be stored in the network information cache 206.

When the restore API 208 needs to restore the servers 302, 304, the restore API 208 can use the network information 325a, 325b including the IP rules 327 to create a new network environment for the servers 302, 304 (e.g., the second network environment 300b). User information 329 can also be used by a user to identify changes that were made to the network information 325a, 325b and the IP rules 327 when the restore API 208 creates the second network environment 300b, as described in greater detail below.

Figure 3B:
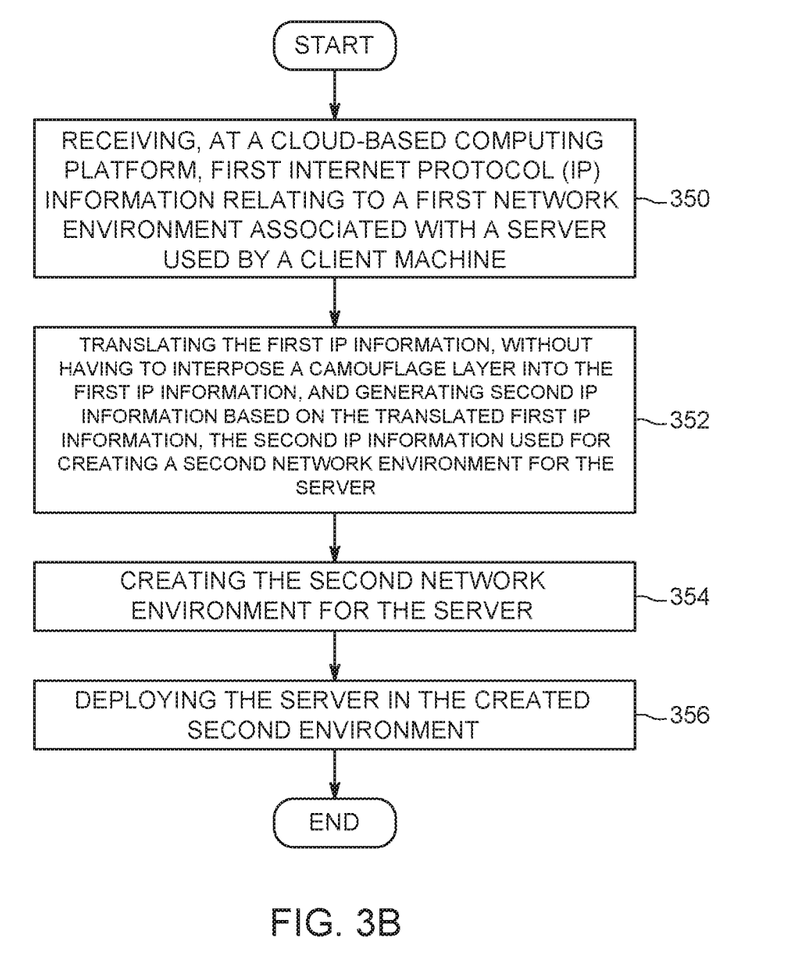
FIG. 3B is flowchart of a method for configuring a network environment for one or more servers used in a client domain, in accordance with an embodiment of the disclosure.

FIG. 3B is a flowchart of method for configuring a network environment for the servers 302, 304, which can be used in the client domain 112, in accordance with an embodiment of the disclosure. It is assumed that all functions performed by the web-based application 200 are controlled by the cloud server 134. Additionally, unless otherwise noted, the method for configuring the network environment for the servers 302, 304 is described herein with respect to the server 304.

Initially, a request is transmitted by the client machine 112 via the domain server 114 to the restore API 208, and the ERS 202 begins receiving and storing the network information 325b associated servers 304. As noted above, the network information 325b can be transmitted to the ERS 202 during an initial setup of the web-based application 200 at the client domain 110.

For example, at 350 the ERS 202 receives first IP information (e.g., the network information 325b including the IP rules 327) relating to the first network environment 300a (e.g., the network 320b in the second network environment 300a) associated with the server 304 used by the client machine 112. A similar process can be performed for the server 302. The first IP information provided to the ERS 202 can automatically be accessed by the restore API 208 upon a request received from the client machine 112 at the client domain 110, e.g., to create the second environment 300b.

At 352, the ERS 202 translates the first IP information and generates second IP information based on the received first IP information. Particularly, when the server 304 is deployed in the second network environment 300b, the IP of the server 304 will change, and so too will the first IP information. Accordingly, prior to the second network environment 300b being created by the restore API 208, the ERS 202 programmatically translates the first IP information. For example, the ERS 202 translates the first IP information of the server 304 to correspond to the new IP of the server 304. For example, interface rules, resource allocation rules, port location rules, firewall rules, network address rules, network address translation rules of the first IP information can be translated based on the new IP of the server 304. For illustrative purposes, in FIG. 3A, for example, the network information 325b and the IP rules 327 of the first network environment 300a are translated and the second IP information is generated by the ERS 202, as shown in the network information 333b and the IP rules 331 of the second network environment 300b.

The ERS 202 can translate the first IP information without having to interpose a camouflage layer into the first IP information. For example, a camouflage layer can include software and/or hardware that intercepts and/or replaces the actual values of the first IP information with expected values, thereby creating an illusion that the first network environment 300a has not changed and making generation of the second network environment 300b transparent. In accordance with the instant application, however, the ERS 202 can skip interposition of the camouflage layer into the first IP information and simply translate the first IP information for generation of the second IP information.

The ERS 202 also configures user information 329 based on the translation used to generate second IP information. The ERS 202 configures the user information 329 into a format that is relatively easy for a user to read/understand. If, for example, the user requires information relating to the firewall rules for second network environment 300b, the user can be provided with the user information 329, which shows a simplified (or condensed version) of the firewall rule (e.g., compare DNAT IFACE-0:80 of the user information 329 with 100.100.50.10:80 of the IP rules 331); however, a user can also be provided with the second IP information, e.g., the network information 333b and the IP rules 331).

Additionally, when the ERS 202 translates the second IP information, the ERS 202 can exclude rules that apply to systems/devices that are not deployed/used in the second network environment 300b. For example, rules that apply to servers, databases, etc. which are not being deployed in the second network environment 300b can be excluded from the user information 329 and/or the second IP information.

A system 100 that uses the methods described herein can create a new network environment for a server in a relatively quick manner, when compared to conventional methods used to create new network environments, which are difficult to create as they need to be created manually. More particularly, the ERS 202 allows a user to track changes in the second network environment 300b, which can aid in the creation of the new environment. Additionally, the user can perform one or more types of tests (DR test as part of normal maintenance of a server, client machines, etc.) using the user information 329 (and/or the second IP information), which is created by translating the first IP information into a relatively easy to read format.

Figure 4:
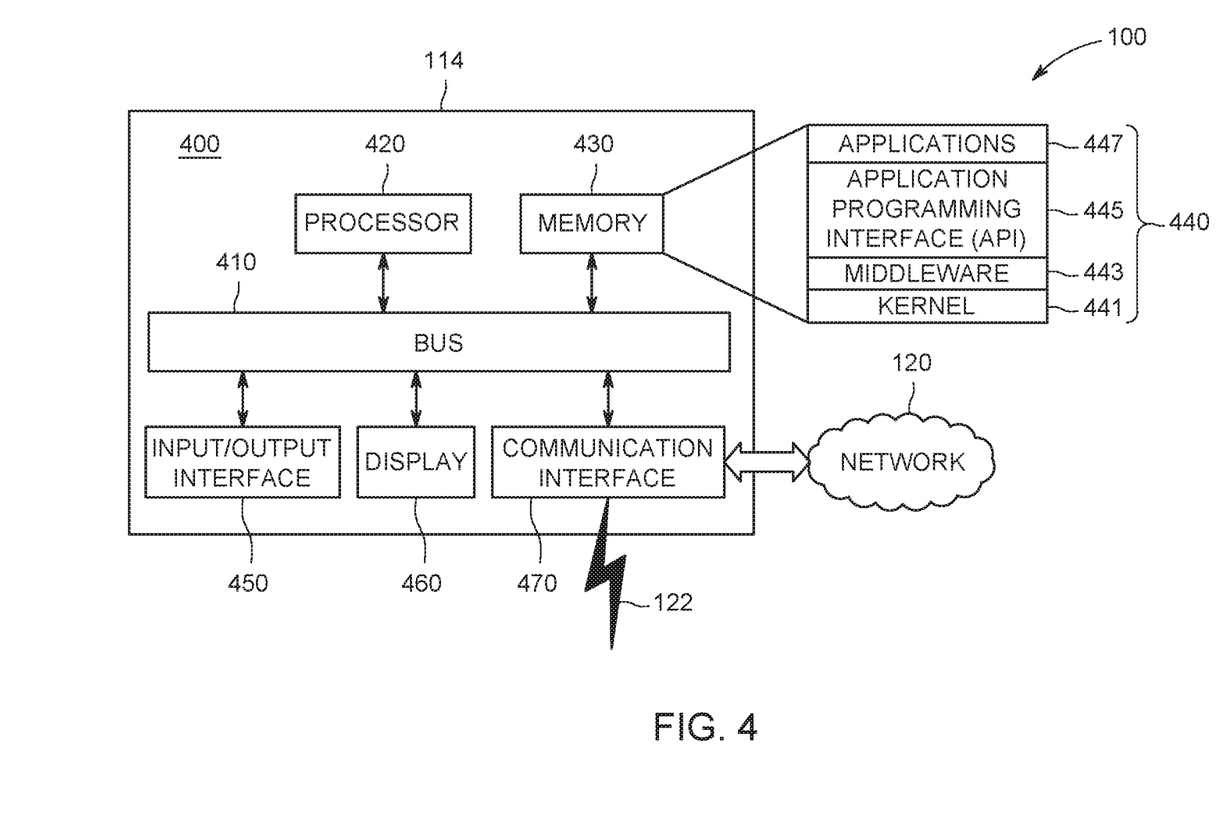
FIG. 4 is a diagram of an electronic device, in accordance with an embodiment of the disclosure.

FIG. 4 is a diagram of an electronic device, in accordance with an embodiment of the disclosure. The electronic device can perform the above-described functions and processes of the client server 114 and/or the cloud server 134.

The electronic device 400 includes a bus 410, a processor or controller 420, a memory 430 (or storage, e.g., the storage 132), an input/output interface 450, a display 460, and a communication interface 470. At least one of the above-described components may be omitted from the electronic device 400 or another component may be further included in the electronic device 400.

The bus 410 may be a circuit connecting the above-described components 420, 430, 450, 460, and 470 and transmitting communications (e.g., control messages and/or data) between the above-described components.

The processor 420 may include one or more of a central processing unit (CPU), an application processor (AP), and a communication processor (CP). The processor 420 can control at least one of the other components of the electronic device 400 and/or processing data or operations related to communication.

The memory 430 may include volatile memory and/or non-volatile memory. The memory 430 can store data or commands/instructions related to at least one of the other components of the electronic device 400. The memory 430 can store software and/or a program module 440 (e.g., web-based application 200). For example, the program 440 may include a kernel 441, middleware 443, an API 445 (e.g., a restore API 208), application programs 447 (or applications, e.g., web-based application 200). The kernel 441, the middleware 443 or at least part of the API 445 may be called an operating system.

The kernel 441 can control or managing system resources (e.g., the bus 410, the processor 420, the memory 430, etc.) used to execute operations or functions of other programs (e.g., the middleware 443, the API 445, and the applications 447). The kernel 441 provides an interface capable of allowing the middleware 443, the API 445, and the applications 447 to access and control/manage the individual components of the electronic device 400.

The middleware 443 may be an interface between the API 445 or the applications 447 and the kernel 441 so that the API 445 or the applications 447 can communicate with the kernel 441 and exchange data therewith. The middleware 443 is capable of processing one or more task requests received from the applications 447. The middleware 443 can assign a priority for use of system resources of the electronic device 400 (e.g., the bus 410, the processor 420, the memory 430, etc.) to the application 447. The middleware 443 processes one or more task requests according to a priority assigned to at least one application program, thereby performing scheduling or load balancing for the task requests. For example, in the event of one of the servers 102, 104 (302, 304) becoming inoperable, the middleware 443 can assign a high priority for the tasks required to restore the servers 102a 104 (302, 304) to an operation state (e.g., when a new network environment needs to be created for both servers 102, 104 (302, 304).

The API 445 may be an interface that is configured to allow the applications 447 to control functions provided by the kernel 441 or the middleware 443. The API 445 may include at least one interface or function (e.g., instructions) for file control, window control, image process, text control, or the like. For example, during a restore operation, the API 445 allows the applications 447 to display one or more user interfaces that allow a user to navigate through the ERS 202 of web-based application 200 to enter the above-described information associated with the servers 102, 104 (302, 304) and their corresponding networks 320a, 320b.

The input/output interface 450 is capable of transferring instructions or data, received from the user or external devices, to one or more components of the electronic device 101. The input/output interface 450 is capable of outputting instructions or data, received from one or more components of the electronic device 400, to the user or external devices. The input/output device 450 can be configured to create one or more GUIs for receiving a user input, as described above.

The display 460 may include a liquid crystal display (LCD), a flexible display, a transparent display, a light emitting diode (LED) display, an organic LED (OLED) display, micro-electro-mechanical systems (MEMS) display, an electronic paper display, etc. The display 460 can display various types of content (e.g., texts, images, videos, icons, symbols, etc.). The display 460 may also be implemented with a touch screen. The display 460 can receive touches, gestures, proximity inputs or hovering inputs, via a stylus pen, or a user's body. Accordingly, the display 450 can be used to receive a user input on one or more GUIs, e.g., the GUI 500.

The communication interface 470 can establish communication between the electronic device 400 and an external device (e.g., backup vendors, servers 102, 104 (302, 304)) connected to the network 120 (320a, 320b) via wired or wireless communication.

Wireless communication may employ, as cellular communication protocol, at least one of long-term evolution (LTE), LTE advance (LTE-A), code division multiple access (CDMA), wideband CDMA (WCDMA), universal mobile telecommunications system (UMTS), wireless broadband (WiBro), and global system for mobile communication (GSM). Wireless communication may also include short-wireless communication 122. Short-wireless communication 122 may include at least one of wireless fidelity (Wi-Fi), Bluetooth (BT), near field communication (NFC), magnetic secure transmission (MST), etc. Wired communication may include at least one of universal serial bus (USB), high definition multimedia interface (HDMI), recommended standard 232 (RS-232), and plain old telephone service (POTS). The network 120 (320a, 320b) may include at least one of a telecommunications network, e.g., a computer network (e.g., local area network (LAN) or WAN), the Internet, and a telephone network.

While the domain server 114 and the cloud server 134 have been described herein as communicating with the servers 102, 104 (302, 304) over the network 120 (320a, 320b), the disclosure is not so limited. For example, one or both of the domain server 114 and the cloud server 134 can communicate with each other and/or the servers 102, 104 (302, 304) over the short-wireless communication 122.

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

Furthermore, while the methods described herein have been described for use with the cloud-based computing platform 130, the disclosure is not so limited. For example, the methods described herein can be performed locally using the client server 114 in the client domain 110. Additionally, one or more of the sequences in the methods described herein can be omitted, or one or more sequences not herein described can be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method for configuring a network environment for a server, the method comprising:
receiving, at a cloud-based computing platform, first internet protocol (IP) information relating to a first network environment associated with a server used by a client machine; translating the first IP information including determining changes to IP rules of the server, without having to interpose a camouflage layer into the first IP information, and generating second IP information in a first format based on the translated first IP information, the second IP information used for creating a second network environment for the server;
creating the second network environment for the server;
generating user information in a second format different from the first format based on the generated second IP information, wherein the second format is a condensed version of firewall rules of the first format, and wherein the condensed version comprises a simplified version of alphanumeric data showing the changes made to the firewall rules;
deploying the server in the created second environment, wherein the IP rules of the server comprise one of interface rules, resource allocation rules, port location rules, network address rules, or network address translation rules;
performing a test for the created second network environment using at least one of the generated second IP information and the generated user information; after performing the test, transmitting results of the test to the client machine; and if the results of the test meet expectations, deploying the server in the created second network environment.

2. The method of claim 1, wherein translating the first IP information comprises determining target devices needed for creating the second network environment and generating the second IP information comprises excluding non-targeted devices from the second IP information.

3. The method of claim 1, wherein the generated user information includes the determined changes made to the IP rules of the server.

4. A non-transitory computer readable storage medium having stored thereon instructions that when executed by a processor perform a method for configuring a network environment for a server, the method comprising:
receiving, at a cloud-based computing platform, first internet protocol (IP) information relating to a first network environment associated with a server used by a client machine;
translating the first IP information including determining changes to IP rules of the server, without having to interpose a camouflage layer into the first IP information, and generating second IP information in a first format based on the translated first IP information, the second IP information used for creating a second network environment for the server;
creating the second network environment for the server;
generating user information in a second format different from the first format based on the generated second IP information, wherein the second format is a condensed version of firewall rules of the first format, and wherein the condensed version comprises a simplified version of alphanumeric data showing the changes made to the firewall rules;
deploying the server in the created second environment, wherein the IP rules of the server comprise one of interface rules, resource allocation rules, port location rules, network address rules, or network address translation rules;
performing a test for the created second network environment using at least one of the generated second IP information and the generated user information;
after performing the test, transmitting results of the test to the client machine; and if the results of the test meet expectations, deploying the server in the created second network environment.

5. The nontransitory computer readable storage medium of claim 4, wherein translating the first IP information comprises determining target devices needed for creating the second network environment and generating the second IP information comprises excluding non-targeted devices from the second IP information.

6. The nontransitory computer readable storage medium of claim 4, wherein the generated user information includes the determined changes made to the IP rules of the server.

7. A cloud-based server of a cloud-based computing platform comprising: a processor; and a memory coupled to the processor and having stored thereon instructions that when executed by the processor configure the cloud-based server to:

receive, at a cloud-based computing platform, first internet protocol (IP) information relating to a first network environment associated with a server used by a client machine;

translate the first IP information including determining changes to IP rules of the server, without having to interpose a camouflage layer into the first IP information, and generating second IP information in a first format based on the translated first IP information, the second IP information used for creating a second network environment for the server;

create the second network environment for the server;

generate user information in a second format different from the first format based on the generated second IP information, wherein the second format is a condensed version of firewall rules of the first format, and wherein the condensed version comprises a simplified version of alphanumeric data showing the changes made to the firewall rules;

deploy the server in the created second environment, wherein the IP rules of the server comprise one of interface rules, resource allocation rules, port location rules, network address rules, or network address translation rules;

perform a test for the created second network environment using at least one of the generated second IP information and the generated user information;

after performing the test, transmit results of the test to the client machine; and if the results of the test meet expectations, deploy the server in the created second network environment.

8. The cloud-based server of claim 7, wherein, when the cloud-based server translates the second IP information, the cloud-based server determines target devices needed for creating the second network environment, and when the cloud-based server generates the second IP information, the cloud-based server excludes non-targeted devices from the second IP information.

9. The cloud-based server of claim 7, wherein the generated user information includes the determined changes made to the IP rules of the server.

\* \* \* \* \*